March 15, 1927.  1,621,113
F. A. HILL
CORN POPPING MACHINE
Filed Feb. 26, 1926    6 Sheets-Sheet 1

Inventor.
Frank A. Hill
By
atty.

March 15, 1927.  F. A. HILL  1,621,113
CORN POPPING MACHINE
Filed Feb. 26, 1926   6 Sheets-Sheet 2

Inventor:
Frank A. Hill
By
atty.

March 15, 1927.   F. A. HILL   1,621,113
CORN POPPING MACHINE
Filed Feb. 26, 1926   6 Sheets-Sheet 3

March 15, 1927.  F. A. HILL  1,621,113
CORN POPPING MACHINE
Filed Feb. 26, 1926   6 Sheets-Sheet 6

Fig. 15

Inventor:
Frank A. Hill,
By [signature] Atty.

Patented Mar. 15, 1927.

1,621,113

UNITED STATES PATENT OFFICE.

FRANK A. HILL, OF DIXON, ILLINOIS, ASSIGNOR OF ONE-HALF TO EDWARD C. FRITZ, OF DIXON, ILLINOIS.

CORN-POPPING MACHINE.

Application filed February 26, 1926. Serial No. 90,761.

This invention relates to improvements in corn popping machines and one of the objects of the same is to provide an improved machine of this character for popping the corn, placing predetermined quantities thereof into cartons or containers, applying butter or flavoring material thereto when in the carton, and then delivering the filled package to the customer.

A further object is to provide an improved machine of this character which will be of a compact and comparatively simple construction and which will be automatic in operation, such operation being controlled by inserting into the machine a proper check or token.

To the attainment of these ends and the accomplishment of other new and useful objects as will appear, the invention consists in the features of novelty in substantially the construction, combination, and arrangement of the several parts hereinafter more fully described and claimed and shown in the accompanying drawings illustrating this invention, and in which;

Referring more particularly to the drawings, the numeral 20 designates generally a casing of any desired size and configuration and within which the mechanism is located.

The casing may be provided in the top thereof with a ventilating opening 21, and a delivery outlet opening 22 through which the filled package is delivered to the customer.

Obviously any portion of the walls of the casing may be constructed of suitable transparent material such as glass or the like.

Within the casing and near the top thereof is a suitable hopper 23 of any desired size for receiving and containing the corn which is to be popped.

The hopper is provided with an outlet opening 24 in its bottom and this opening is controlled by a slide valve 25 having a suitable opening 26 therein, movable into and out of register with the opening in the bottom of the hopper.

A spring 27 may be provided which tends normally to move the valve 25 in one direction, and the valve is adapted to be moved in the opposite direction, preferably by means of a suitable flexible member 28 connected thereto and which leads over a pulley 29 to suitable actuating mechanism to be hereinafter described.

A chute 30 is arranged beneath the hopper and is adapted to receive the corn and direct the same to a heater or popper designated generally by the reference numeral 31 and which latter is suitably supported.

Figure 14:
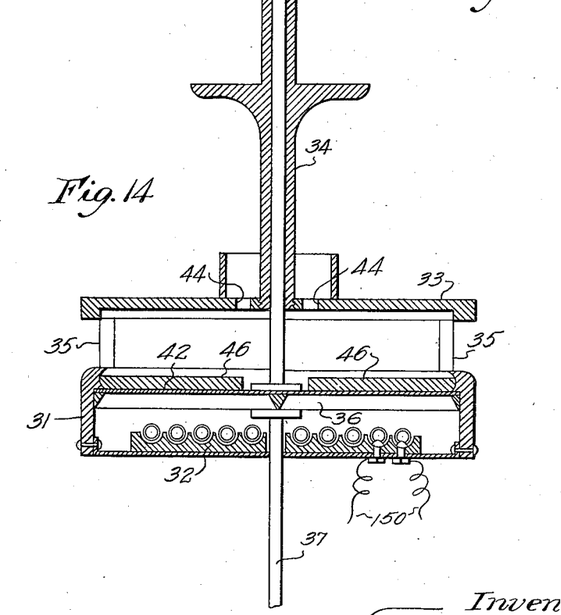
Figure 14 is an enlarged vertical sectional view of the heater or popping element.
Figure 15:
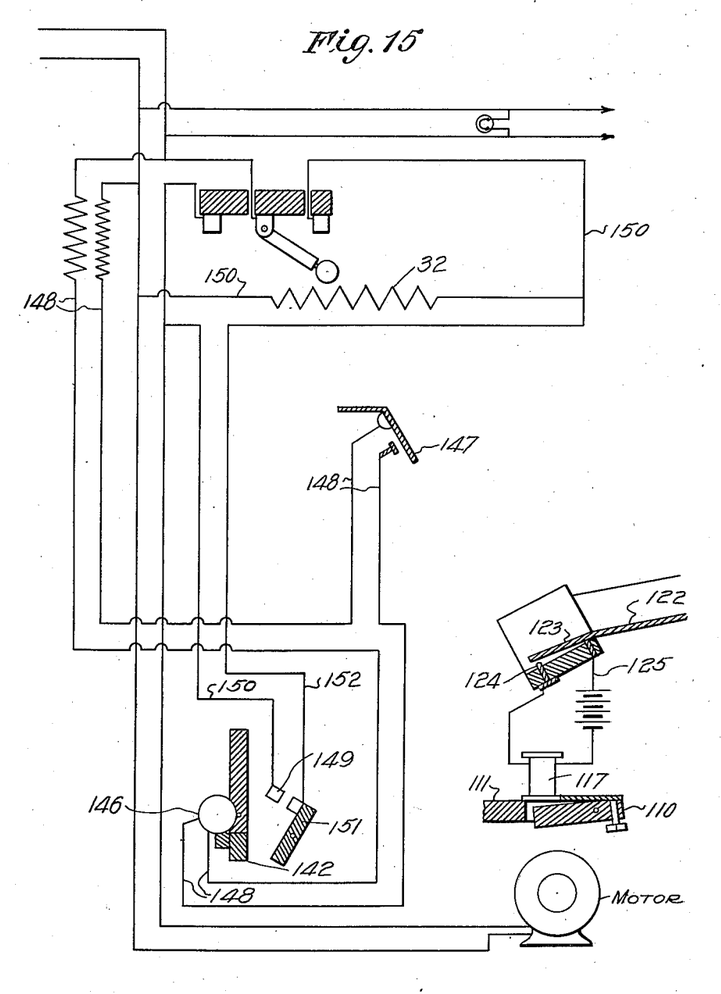
Figure 15 is a diagram of the wiring of the various parts.

This heater may be of any desired construction but preferably embodies an annular member within which a heating element 32 is supported. Disposed above the popper 31 is a deflector 33 which is supported in any suitable manner, preferably by means of a support 34 to which it is secured and the heating member 31 is preferably supported by means of hanger members 35, from the deflector 33.

Disposed intermediate the heating element 32 and the deflector 33 is a support 36 which may be of any desired configuration but is preferably of a wheel like formation which is rotatable on an upright axis within the annular body portion of the popper 31. The element 36 is connected with a shaft 37 which has a bearing in the support 34 and the shaft has connected with it, at one end, a crank arm 38 by means of which the shaft 37 may be rotated and with which shaft the support 36 is connected. A link 39 connects the crank arm 38 with another crank arm 40, the latter being carried by a shaft 41. Mounted upon the support 36 is a disc like member 42, preferably constructed of thin sheet metal, and this member 42 rotates with the heater member 31. A portion of the annular body of the heater 31 is preferably shaped to form an overhanging flange 43 which projects over the periphery of the supporting member 42. The corn is delivered from the chute 30 on to the member 42 preferably through openings 44 in the deflector 33, and as the heating element 32 is disposed below the member 42, the heat from the element will cause the corn to be popped. As the corn is popped it will be thrown off of the element 42 over the side of the heater 31 and will be directed by the deflector, into another hopper like formation 45 within which the heating element and deflector 33 are arranged.

Supported by the body of the heater 31 and stationary with respect to the member 42, are a plurality of ribs or projections 46 which serve the purpose of causing the kernels of corn to be tumbled as the member 42 is rotated.

The hopper 45 may be of any desired size but is preferably of a size to hold a suitable amount of popped corn. The hopper is preferably of a conical formation and constitutes a filling mechanism and is provided with a discharge opening 47 adjacent its bottom through which the popped corn is delivered into the cartons when placed thereunder. Closures 48 are provided for closing the opening 47. These closures are pivotally mounted as at 49 intermediate their ends and each of the closures is provided with a lateral projection 50 which co-operate to form cut-offs or a closure for the opening 47 when the closures 48 are open with respect to each other, thereby shutting off the delivery from the hopper of any of the material which is above the closures 50 when the closures 48 are open.

When the closures 48 are closed, the cut-offs or closures 50 will be open so as to permit a supply of the popped corn to be delivered between the closures 48, to be delivered therefrom when the latter are again opened. At this time the closures 48 will swing about their pivotes 49 to cause the closures 50 to become active.

As a means for agitating the material within the hopper 45, the shaft 37 is of a length to extend below the heater 31 and into the hopper, terminating at any desired point above the outlet thereof. This shaft 37 is provided with a plurality of agitators 51 which, when the shaft is rotated, will agitate the material. The closures 48 are adapted to be swung about their pivots in any suitable manner but preferably by means of an arm 52 which is connected with the closures preferably by means of links 53, and the arm 52 is preferably of such a weight that when released it will serve as a means for bringing the closures 48 together.

The arm 52 is adapted to be actuated automatically, at a predetermined time in the cycle of operation of the machine, by mechanism which will be later described.

The material as it is delivered from the hopper 45 is placed within a bag, carton, or receptacle 54 and a supply of these cartons is held within the casing 20 in a container or holder 55, the cartons being delivered through the lower end thereof.

The cartons are nested and are adapted to be delivered singly from the bottom of the stack, automatically at the proper time in the operation of the machine.

To that end there is provided adjacent the open bottom of the hopper a controlling device which consists of a member 56 pivotally supported intermediate its ends as at 57. The member is preferably of a double dog like formation, one extremity 58 thereof being adapted to engage the pile of cartons above the lowermost carton for arresting the feeding movement of the carton when the lowermost one is being removed from the holder 55. The other extremity 59 of the member 56 is adapted to be projected beneath the open end of the container or holder 55 to arrest the feeding movement of the cartons when the end 58 of the member 56 is withdrawn.

An actuating arm 60 is provided for rocking the member 56 about its pivot. This member 60 is pivotally mounted, preferably upon the same pivot as the member 56, and is provided with a lug or lateral projection 61 that extends into and operates within an elongated slot 62 in the member 56. The member 56 is swung about its pivot by the member 60 when the lug 61 engages one or the other of the extremities of the slot 62. A spring 63 is preferably provided which tends normally to move the arm 60 in one direction about its pivot.

The arm 60 is rocked about its pivot against the stress of the spring 63 by mechanism which will be presently described.

A container 64 is provided for holding flavoring material preferably butter and from which container the material will be delivered on to the material within the carton after the carton has been filled. If butter is employed it is maintained in a liquid or semi-liquid condition by means of the heat within the machine, and the discharge of the butter is automatically controlled preferably by means of a hollow rotary valve 65 which operates within a casing 66, and which casing has communication with a discharge outlet 67 leading from the receptacle 64. The receptacle 64 is supported in any suitable manner preferably upon a support 68 and the valve 65 is adapted to be operated by means of an arm 69 which is preferably of a weight that tends normally to move the valve in a direction to close the same, and shut off the delivery of any of the contents of the receptacle 64.

The delivery ends of the container 55, the hopper 45 and the receptacle 68, are arranged in such positions with relation to each other, that the carton when removed from the container 55 will be first presented to the hopper 45 to receive a supply of popped corn, and will then be carried to a position so that some of the contents of the receptacle 64 will be delivered into the carton, after which the filled carton will be positioned so that it may be removed through the delivery outlet 22 of the casing.

This operation may be accomplished in any suitable manner, but preferably as follows:

Carried by a reciprocable and rotatable shaft 70 is an arm or support 71 which projects laterally therefrom, and mounted upon the arm or support 71 are two pairs of opposed dogs 72—73 preferably in the form of bell crank levers. As the construction and operation of each pair of dogs is the same, the description of one pair will apply to both. These dogs are pivotally mounted respectively as at 74—75, and the extremities of one of the ends of the levers are disposed in proximity to each other and are slotted. A platform 76 is disposed between the dogs and is connected with the slotted extremities of the dogs.

A portion 77 of one of the dogs or each pair projects beyond the pivot for a purpose to be described.

Any suitable means such as a spring 77$^a$ may be provided for swinging the dogs about their pivots away from each other, so as to permit one of the cartons to pass therebetween and engage the platform 76. Pressure upon the platform will cause the latter to be lowered and the dogs 72—73 to be swung in the opposite direction about their pivots, so that the shoulders on the dogs will engage the shoulders on the carton. When the dogs are in this position, and the arm or support 71 is lowered, one of the cartons will be removed from the container or holder 55.

Carried by the arm 71 is a projection 78 which, when the shaft 70 is elevated to cause the dogs 72, 73 to grasp one of the cartons, will engage the arm 60 on the member 56 to swing the latter about its pivot for releasing the lowermost carton. When the shaft 70 is lowered the carton which is engaged by the dogs 72—73 will be removed and at the same time the arms 60 will be lowered to again swing the member 56 in another direction about its pivot to position another carton to be removed.

The shaft 70 with the carton carried by the arm, will then be rotated in a manner to be presently described so that the carton will then be positioned under the hopper 45 and in a position to receive a supply of material from the hopper when the closures 48 are open. The shaft 70 will then be again elevated and the projection will engage the arm 52 to open the closures 48 and close the closures 50 to deliver a predetermined quantity of the contents of the hopper 45 into the carton.

The shaft 70 will then be lowered carrying with it the filled carton. Upon the next step in the operation of the machine the shaft 70 will be further rotated to cause the filled carton to be carried to a position beneath the discharge outlet of the receptacle 64.

The shaft 70 is then again raised and the projection 78 will engage the arm 69 on the valve 65 to rotate it and thereby open the discharge outlet of the receptacle 64, to deliver a portion of the contents of the receptacle into the filled carton.

The valve 65 is preferably tubular and is so shaped that it will deliver only a predetermined quantity of material from the receptacle 64 upon each cycle of operation of the valve.

The shaft 70 is then again lowered, during which time the weight of the arm 69 will close the valve 65. When the shaft 70 reaches the limit of this lowering movement, it is then given another step of rotation so as to swing the filled carton into a position in proximity to the delivery opening 22 of the casing 20. This delivery opening 22 is closed by means of a sliding closure 79, and adjacent the opening and within the enclosing casing is a casing like structure 80 into which the filled carton will be raised or positioned upon another step in the raising operation of the shaft 70. The closure 79 is adapted to be operated preferably by means of arms 81 pivotally mounted by one extremity as at 82. Links 83 are connected to the other extremities of the arms 81 and to the closure 79. Springs 84 are connected with the arms 81 and tend normally to move them in directions to move the closure 79 in a direction to close the delivery outlet 22.

This closure 79 is adapted to be automatically opened when the filled carton is in proximity to the opening 22 and as a means for accomplishing this result there are provided arms 85, which are pivotally mounted intermediate their ends as at 86. Links 87 are connected by one end to the respective arms 85 and by their other ends to the arms 81.

The other extremities 88 of the arms 85 project into the path of the upward movement of the extensions 77 of the dogs 72 carried by the arm or support 71, and these extremities 88 are so disposed that when the shaft 70 is elevated to position the filled carton within the chamber 80 adjacent the delivery opening 22, the extensions 77 of the dogs 72, will strike the extremities 88 of the arms 85, and the dogs will be first rocked about their pivots against the stress of the spring 77$^a$, to release the carton, after which the arms 85 will be rocked about their pivots to swing the arms 81 about their respective pivots against the stress of the springs 84, and through the medium of the links 83, the closure 79 will be shifted so that the filled carton can be removed through the opening 22.

When the shaft 70 is lowered again the springs 84 will operate to close the closure 79.

The main driving mechanism embodies a motor 89 arranged within the casing 20, and drives through the medium of a belt 90, a pulley 91 which is connected with a shaft 92 for rotation therewith. The shaft is preferably located adjacent the base of the casing and is journaled in suitable bearings.

Connected with the shaft 92 for rotation therewith is a clutch member 93 that is fixed upon and for rotation with the shaft. Supported by the shaft is another clutch member and is rotatable independently of the shaft. This clutch member 94 cooperates with the clutch member 93 to be locked and unlocked with respect to the shaft 92.

A portion of the clutch member 94 is shaped to form a pulley over which a belt 95 passes, and the belt also passes over another pulley 96 on a separate shaft. Connected to rotate with the pulley 96 is another pulley 97, and a belt 98 passes over the pulley 97 and also a pulley 99, so that motion will be imparted from the motor 89, belt 90, to the pulley 91, shaft 92, clutch pulley 93—94, belt 95, pulley 96, pulley 97, belt 98, to the pulley 99.

This latter pulley operates the shaft 70 to reciprocate the latter and also impart intermittent steps of rotation thereto.

This may be accomplished in any desired or suitable manner but preferably as follows:

The shaft 70 is mounted to rotate in bearings which slide upon guideways 100, and reciprocation is imparted to the shaft preferably through the medium of a link 101 which is connected with the reciprocating bearing and also with the pulley 99.

The shaft 70 has connected with it a plurality of pins or arms 102, preferably four in number, one for each step of rotation to be imparted to the shaft. These pins or arms 102 project laterally from the shaft and are arranged within the path of movement of a tappet or projection 103 projecting laterally from the face of the pulley 99, so that upon each complete rotation of the pulley 99 the shaft 70 will be given one step of rotation, upon each complete cycle of rotation of the shaft 70 four steps of movement will have been imparted thereto, one step to position the carton receiving and removing mechanism beneath the carton container, the next step to position the carton beneath the supply hopper, the third step to position the carton beneath the receptacle 64, and the final step to position the carton adjacent the delivery opening 22.

The shaft 70 may be held against overthrow in any suitable manner but preferably by means of a brake device embodying co-operating brake members 104 arranged on opposite sides of the shaft. Each of the brake members is provided with a semi-circular recess in adjacent faces, and through which recesses the shaft passes. The members 104 are secured together by spring fastening devices 104$^a$ passing therethrough and the members are provided with co-operating guide slots 106, to receive the guideways 100, so that the brake device 104 will reciprocate upon the guides 100, as the shaft is reciprocating and the friction or the clamping action of the brake members 104 upon the shaft 70, will control and will prevent overthrow of the shaft 70 when the latter is rotated by the brake members being held against rotation by the guide members 100.

If desired an additional safety device may be provided to prevent overthrow of the shaft 70 and embodies a disc like member 70$^a$ carried by the shaft 70 and which member is provided with recesses or seats 70$^b$ on one face thereof the sides of the seats being beveled or inclined. A stationary member 70$^c$ is arranged adjacent the path of movement of the member 70$^a$ and the extremity 70$^d$ projects over the disc 70$^a$ to enter one or the other recesses or seats 70$^b$ upon each upward movement of the shaft 70.

The shaft 41 which actuates the agitator shaft 37 carrying the arms 51, within the hopper 45, is rotated from the shaft 94 through the medium of a pulley 105 which is connected with the shaft 92 and a crossed belt 106 which extends over the pulley 105 and also over a pulley 107 that is connected with the shaft 41 for rotation therewith.

The clutch, embodying the clutch elements 93 and 94, is adapted to be rendered active and inactive, in any suitable manner but preferably as follows:

A pivotally supported yoke 108 engages the clutch member 94, and a spring 109 is provided which tends normally to move the member 108 in a direction to cause the clutch member 94 to engage the clutch member 93.

The clutch member 94 is held out of engagement with the clutch member 93 and against the stress of the spring 109 by means of a latch device 110, which is supported by a member 111. The latch is preferably pivotally mounted intermediate its ends as at 112 so that one extremity 113 of the latch will be adapted to assume a position in front of a shoulder or projection 114 carried by the yoke 108. A screw device 115 is provided in the latch member so as to regulate or vary the extent to which the end 113 will project below the member 111.

The member 111 projects through an opening 116 in the yoke 108, above the shoulder or projection 114, and is so arranged that the extremity 113 of the latch may be positioned in front of the shoulder 114 when the latch is lowered. The member 111 is supported for a slight reciprocating movement by the projection 114 and bottom of the slot or opening 116 in the yoke and the opening 116 is of a height sufficiently greater than the height of the portion of the member 111 that passes therethrough to prevent the member 111 to swing slightly with respect to the yoke 108.

When the latch is swung about its pivot 112 in the opposite direction to raise it out of engagement with the shoulder 114, the yoke 108 will be swung by the stress of the spring 109, so as to cause the clutch member 94 to engage the clutch member 93.

The latch member 110 is controlled by an electro-responsive device such as a magnetic coil 117, controlled in a manner to be set forth. When the coil is energized the latch 110 is raised to release the yoke 108, and when the coil is de-energized, the latch will drop into the path of movement of the projection 114 on the yoke 108. The yoke 108 is moved in the opposite direction and against the stress of the spring 109 by means of a pivotally mounted member 118, which is connected through the medium of a flexible member 119, with a bell crank lever 120. The other end of the lever 120 is connected with the member 111, so that when the member 118 is swung in one direction about its pivot the yoke 108 will be moved about its pivot to disengage the clutch members 94 and 93 through the medium of the latch 110 engaging the shoulder or projection 114 on the yoke. When the member 118 is released, the spring 109 will return the yoke 108.

The member 118 is swung about its pivot by means of a projection 120ª connected with the reciprocating shaft 70, the projection 120ª being positioned under a beveled extremity 121 of the member 118, so that when the shaft 70 is elevated by the pulley 99 and link 101, during a portion of the operation of the machine, the projection 120ª will engage the beveled end 121 of the member 118 to raise the latter and by pulling upon the flexible member 119, the bell crank lever 120 will be rocked and the yoke member 108 will be moved against the stress of the spring 109.

The member 118 also controls the insertion and delivery of a check for actuating the mechanism and for controlling the circuit of the electro-responsive device 117.

When a check is inserted into the machine through a check slot, the check will travel down a chute or run way 122 to engage a resilient contact member 123 that co-operates with a contact terminal 124, from which latter a conductor 125 leads to the coil 117. The other end of the winding of the coil has connection through a conductor 126 with the contact member 123. A coin arresting and ejecting member 127 is pivotally mounted as at 128 and is provided with a seat 129 against which a check 130 rests. When the check engages the contact member 123, the weight of the check will move the contact member into engagement with the contact terminal 124, to close the circuit through the magnetic coil 117, to render the latter active, for tripping the latch 110.

One end of the member 127 is connected by means of a flexible member 131 with the member 118, so that when the member 118 is actuated, the member 127 will be rocked in a direction to eject the check 130 into a check receiving receptacle 132, and thereby interrupt the circuit in which the coil 117 is included, to de-energize the latter and permit the latch 110 to assume an active position to lock or hold the clutch member 94 in an inoperative position with respect to the clutch member 93.

When the member 118 is rocked in the opposite direction the member 127 will assume its normal position to receive another check.

The valve 25 for controlling the supply of material delivered to the popping mechanism is actuated against the stress of the spring 27 from the shaft 92, through the medium of a worm 133 which is secured to the shaft 92, for rotation therewith. The worm 133 meshes with a worm gear 134 carried by a stub shaft 135, journaled in a suitable bearing 136.

A member 137 is pivotally mounted as at 138 to a support 139, and the member 137 has a section 140 hingedly connected to the lower end thereof, and which section 140 is arranged within the path of movement of a pin or projection 141 extending laterally from the worm gear 134.

A shoulder 142 is carried by the projection 140 and extends laterally therefrom, and carried by the member 137 is a latch 143 which is pivotally connected thereto as at 144. The lower end of the latch 143 is disposed in a position that when the extension 140 is in one of its positions with respect to the member 137, the end of the latch will engage the projection 142 on the extension 140, and lock the latter against movement about its pivot with respect to the member 137, so that when the pin or projection 141 on the gear 134 engages the projection 140, the member 137 will be rocked about its pivot to pull upon the flexible member 28, and thereby operate the valve 25 against the stress of the spring 27.

A spring 145 is preferably provided which tends normally to move the latch 143 in a direction to engage the shoulder 142 on the extension 140.

When the latch 143 is retracted so as to move out of engagement with the shoulder 142, the extension 140 of the member 137 will be free to move about its pivot during the rotation of the worm gear 134 when the projection 141 engages the extension 140, so that the valve 25 will not be operated.

This operation will take place when a predetermined quantity of the popped corn has accumulated in the hopper 45.

To render this actuating mechanism ineffective at that time, an electro-responsive device 146 is provided for actuating the latch 143, which latter serves as an armature, against the stress of the spring 145. Within the hopper 45 is a circuit controlling switch 147 from the terminals of which switch, conductors 148 lead to the coil 146 of the electro-responsive device.

As the hopper fills, the weight of the material upon the switch device 147 will cause the switch to close the circuit through the coil 146 to render the latter active.

As the supply of material in the hopper 45 decreases, the circuit controlling device 147 will be automatically opened, so as to de-energize the coil 146 and to permit the spring 145 to position the latch 143 to again lock the extension 140 against movement with respect to the member 137.

Any form of circuit controlling means suitable for this purpose may be employed.

Means are provided for rendering the heating or popping element inactive at the same time that the actuating mechanism for the valve 25 is rendered inactive, and for that purpose there may be provided a switch device embodying a contact terminal 149 to which a conductor 150 is connected that leads to one side of the heating element, and a movable contact member 151 from which a conductor 152 leads to the other side of the heating element.

The movable switch member 151 is preferably pivotally mounted intermediate its ends as at 153, and one extremity of the contact member 151 is arranged in the path of movement of the pin or projection 141 on the worm gear 134. A link 154 forms a connection between the switch member 151 and the member 137, and the link is so arranged that when the extension 140 on the member 137 is locked so that when the member 137 is actuated, the valve 25 will be operated, the switch member 151 will be moved so as to contact with the switch member 149, and thereby complete the circuit through the heating element 32.

When the extension 140 is unlocked with respect to the member 137, the pin or projection 141 on the gear 134 will, at a predetermined point in the cycle of operation thereof, engage the switch member 151 and move it out of engagement with the contact 139 to break the circuit through the heating element, and as the switch member 151 is thus moved, the link 154 will swing the member 134 about its pivot in a direction that it will not pull upon the flexible member 28.

The various circuits may be supplied from a source of electric supply outside of the machine in any desired or suitable manner, well known, and not illustrated.

It is thought that the operation of this apparatus will be clearly understood from the foregoing description but briefly stated it is as follows.

In operation the machine discharges a small amount of corn into the popper 31 by operating the valve 25 at the bottom of the hopper 23 and this valve operates intermittently and keeps the popper working steadily.

As the valve opens the corn as it is popped tumbles over the side of the popper and falls into the hopper 45, on the side of which hopper is mounted the electric circuit controlling device 147.

As the hopper 45 fills the corn actuates the circuit controlling device 147 to close a circuit through the magnetic coil 146 which controls the operation of the latch 143 and the member 137 to draw upon the flexible member 28 to move the valve 25 against the stress of the spring 27.

As this circuit closes it stops the operation of the valve 25 and also stops the heater 31. The hopper 45 will then be full of popped corn.

Figures 1, 5, 6, 7:
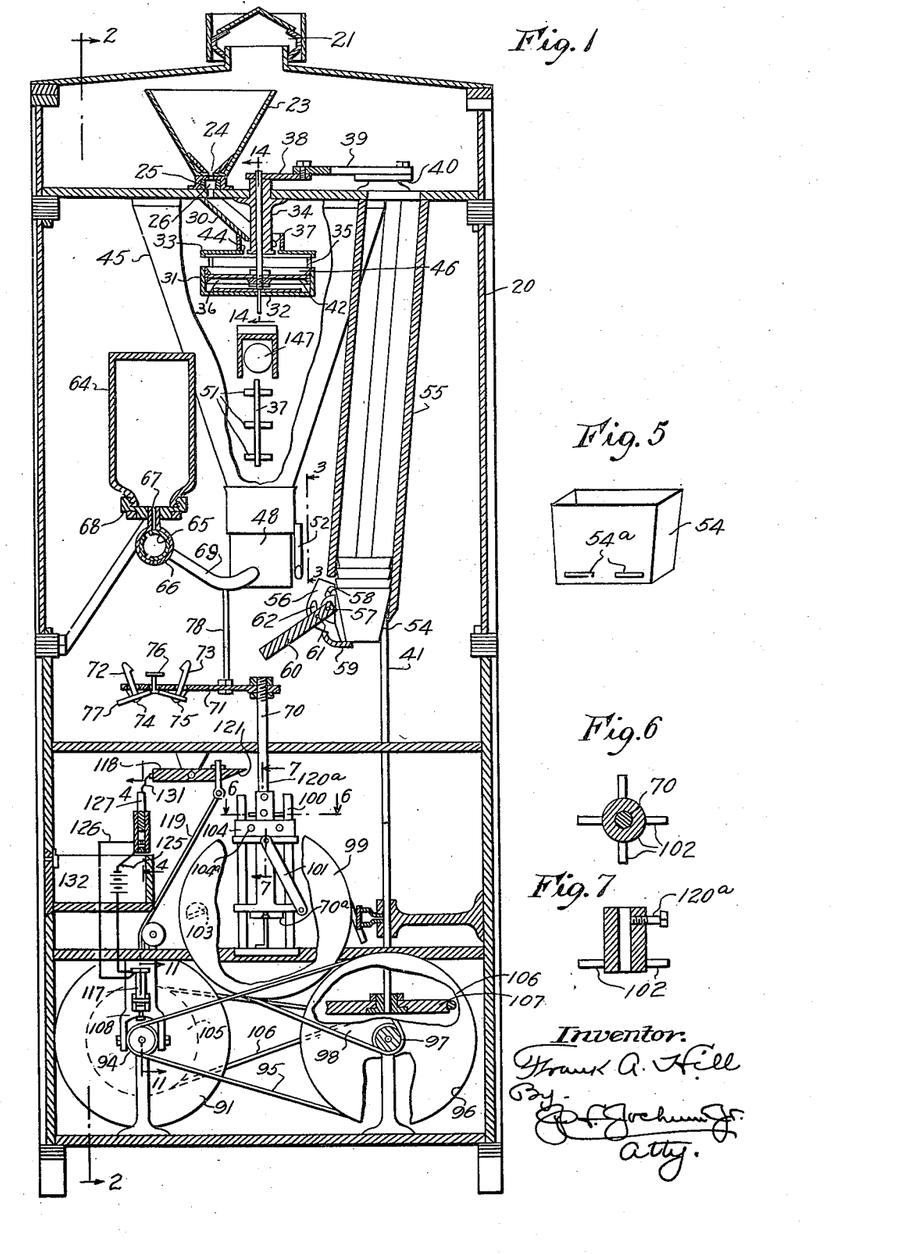
Figure 1 is a vertical longitudinal sectional view of a machine of this character constructed in accordance with the principles of this invention and as taken on line 1—1 Figure 2.
Figure 5 is a detail view of one of the cartons or containers.
Figure 6 is a detail sectional view taken on line 6—6 Figure 1.
Figure 7 is a detail sectional view taken on line 7—7 Figure 1.
Figures 2, 3, 4:
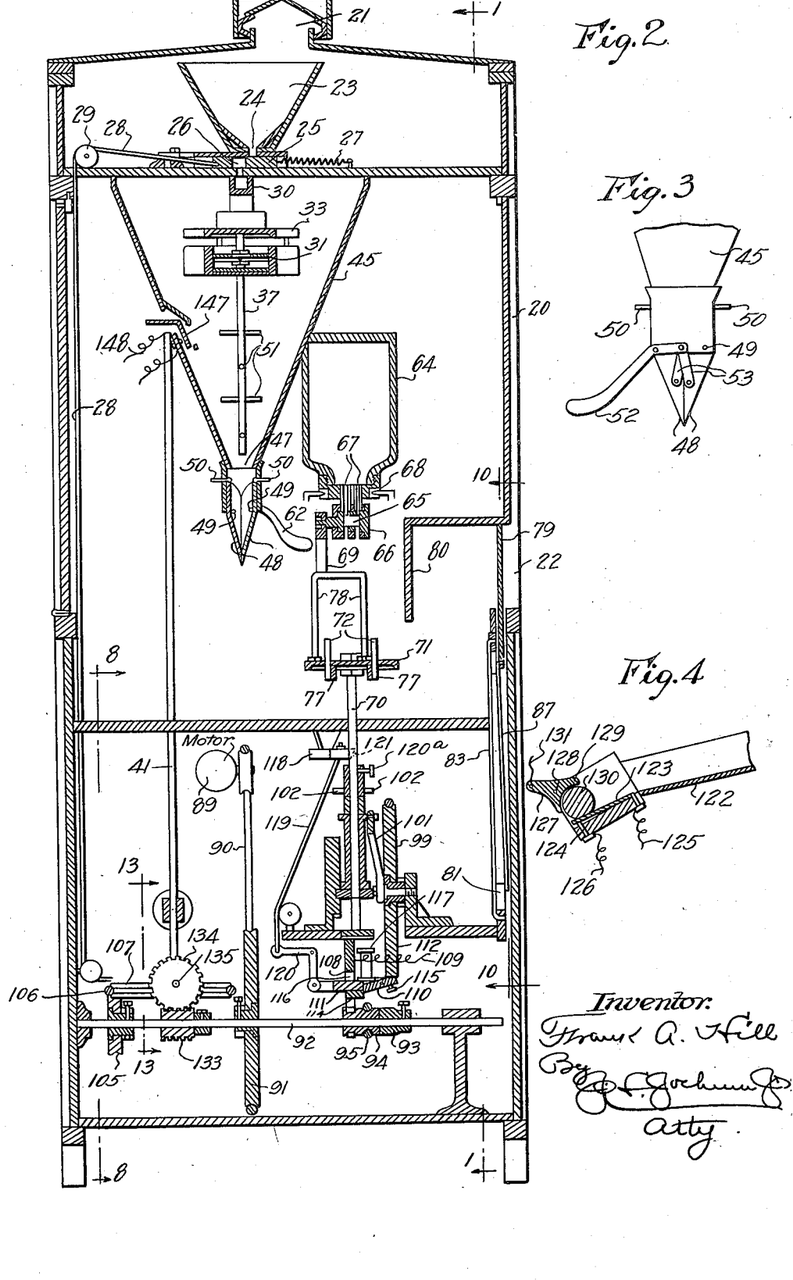
Figure 2 is a vertical longitudinal sectional view taken on line 2—2 Figure 1.
Figure 3 is an enlarged detail elevation of the lower end of the delivery hopper.
Figure 4 is a detail sectional view taken on line 4—4 Figure 1.
Figure 8:
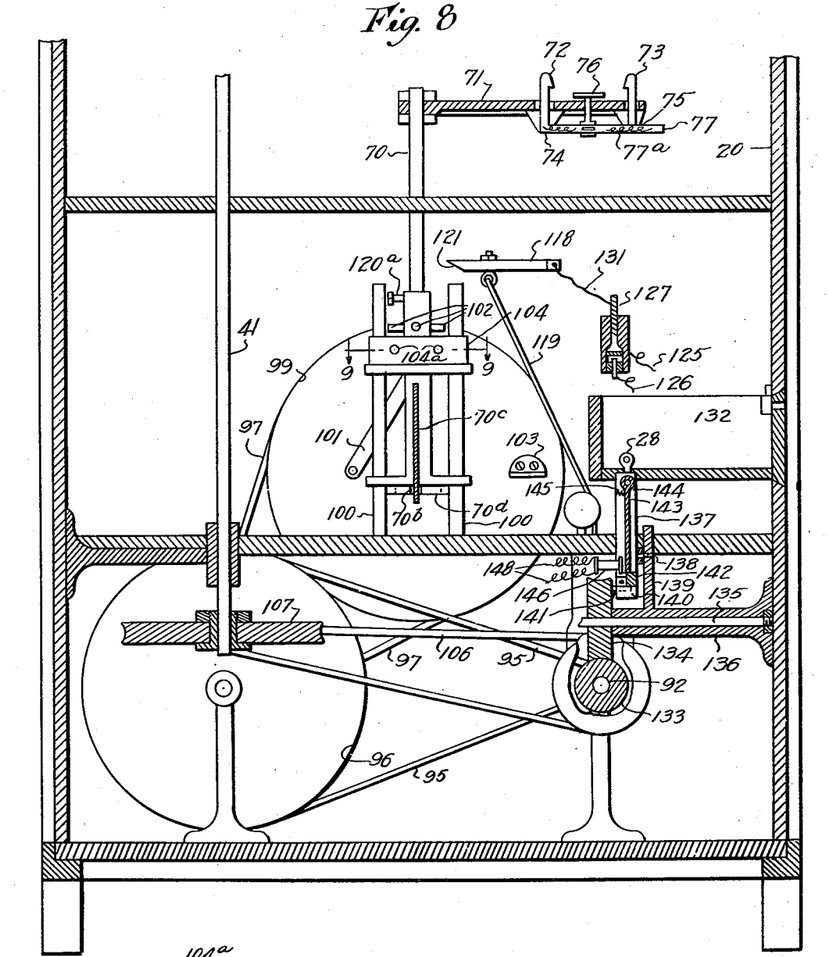
Figure 8 is an enlarged vertical sectional view similar to Figure 1, of the lower portion of the machine and with parts omitted.
Figure 9:
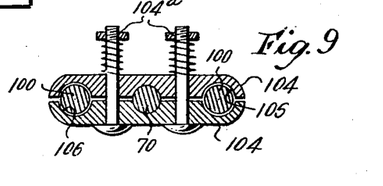
Figure 9 is a horizontal sectional view on line 9—9 Figure 8.
Figure 10:
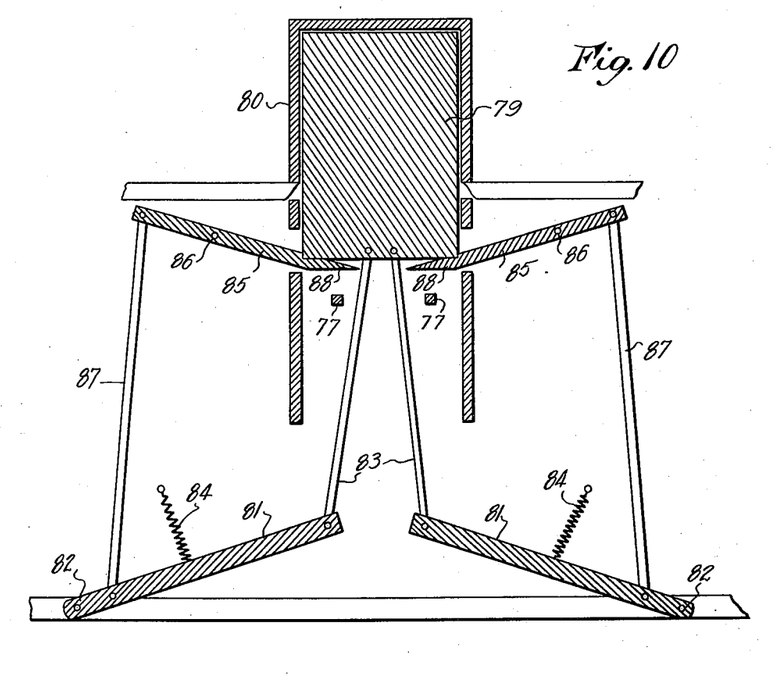
Figure 10 is a detail sectional view taken on line 10—10 Figure 2.
Figure 11:
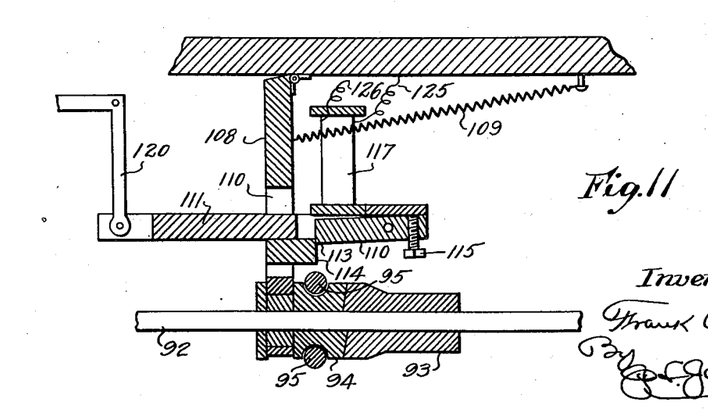
Figure 11 is an enlarged detail vertical sectional view of the clutch controlling mechanism.
Figure 12:
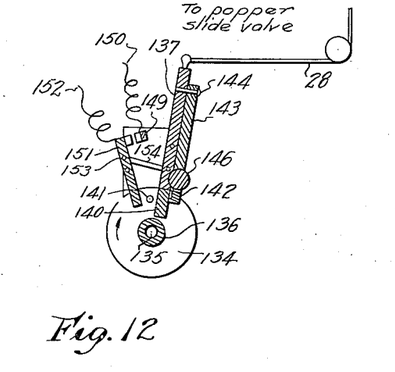
Figure 12 is a detail vertical sectional view taken on line 12—12 Figure 13.
Figure 13:
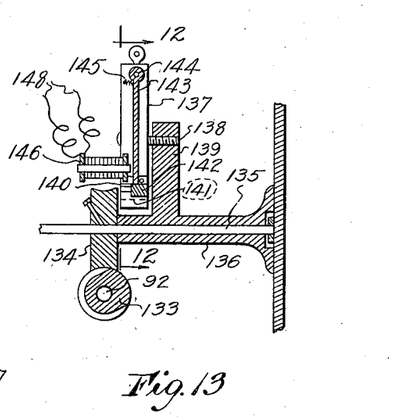
Figure 13 is a detail vertical sectional view taken on line 13—13 Figure 2.

When a check 130 (see Figure 4) is deposited in the check chute 122 it will actuate the contact 123 to close the circuit through the magnet 117 to control the magnetic clutch which starts the carton carrying arm 71 into operation.

The carton removing and carrying mechanism is given a vertical reciprocatory movement by means of the element 99 and link 101 and is given a rotary movement by means of the projection 103 engaging the arms 102 on the shaft 70 to which the support 71, carrying the fingers 72 and 73, is mounted.

In operation this carton carrying mechanism after being lowered, is given a one-quarter turn by the projection 103 engaging one of the arms 102, after which it is raised by the link 101 to position the fingers 72—73 under the hopper or holder 55 containing the cartons 54. The platform 76 engages the bottom of the lowermost carton and the fingers or dogs 72—73 are caused to close over the bottom of the carton so that when the carrier again lowers it will remove the lowermost carton from the supply. As the carton carrier is elevated to grip the lowermost carton in the supply the projection 78 will engage the arm 60 on the carton delivery control mechanism and will actuate the latter so as to insure the removal of only one carton from the supply.

The carton carrier is then given another step of rotary movement or a one-quarter turn by means of the projection 103 engaging another one of the arms 102 to place the carton in the carrier beneath the hopper 45. The carton carrier is then elevated by means of the link 101 and member 99 to cause the projection 78 to engage the arm 52 to actuate the closures 48, so that they will open and permit the popped corn from the hopper 45 to be delivered into the carton therebeneath. As the closures 48 open the cut-offs 50 will be moved so that they will cut off the supply from the hopper and insure the delivery of only a predetermined amount of popped corn into the carton. The carton carrier with the filled carton thereon is again lowered by means of the member 99 and link 101, and as it is lowered the closures 48 will close and the cut-offs 50 will open. The carton carrier is then given another step of rotation or a one-quarter turn so as to position the filled carton beneath the container 64. After the carton has arrived at this position the carton carrier is then again elevated by means of the member 99 and link 101 until the projection 78 engages the arm 69 to actuate the valve 65 to permit a quantity of the flavoring material to be delivered from the container 64 into the carton and upon the popped corn therein. The carton carrier with the filled carton thereon is again lowered and another rotary step of movement is imparted to the carton carrier by means of the projection 103 engaging another one of the arms 102 and the filled carton will then be positioned beneath the casing 80 adjacent the delivery outlet opening 22.

As the filled carton is then again raised the extension 77 of the dogs 72 will engage the ends 88 of the arms 85 to lower or open the door 79 to permit the carton to be removed through the delivery opening 22.

The carton carrier remains in this position until another check is inserted in the check slot when the operation repeats itself. As the popped corn in the hopper 45 lowers the circuit controlling member 147 operates to break the circuit through the clutch magnet 117.

With this improved construction it will be manifest that there will be provided a machine for popping corn, placing a predetermined quantity thereof into a carton, applying a flavoring, such as butter or any other suitable flavor, and then delivering the filled package to a position that it may be removed from the machine by the operator, all automatically and upon the insertion of a proper check or token, the delivery opening for the package being closed during the operation of the machine and being automatically opened when the package is ready and in position to be removed.

Furthermore means are provided whereby the supply of popcorn will control the operation of certain parts of the mechanism, thereby obviating the danger of overproduction and of clogging the machine.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A corn popping machine embodying popping mechanism, butter delivering mechanism, a carton receiving mechanism, a package delivery opening, and means for operating the said receiving mechanism to carry the carton successively to the popping mechanism, butter delivery mechanism and package delivery opening.

2. A corn popping machine embodying popping mechanism, flavoring delivery mechanism, a carton receiving mechanism, a package delivery opening, and means for operating the said receiving mechanism to carry the carton successively to the popping mechanism, flavoring delivery mechanism and package delivery opening, the said operating means embodying mechanism for imparting a reciprocating and a rotary movement to the receiving mechanism.

3. A corn popping machine including popping mechanism, filling mechanism, flavoring delivery mechanism, a package delivery opening, a holder for a supply of cartons, carton receiving mechanism, and means for actuating said receiving mechanism for removing one of the cartons from the said holder and successively carrying the carton to the filling mechanism, flavoring delivery mechanism, and the said delivery opening.

4. A corn popping machine including popping mechanism, filling mechanism, flavoring delivery mechanism, a package delivery opening, a holder for a supply of cartons, carton receiving mechanism, means for actuating said receiving mechanism for receiving one of the cartons from the said holder and successively carrying the carton to the filling mechanism, flavoring delivery mechanism, and said delivery opening, and means responsive in its operation to one of the operations of the carton carrying mechanism for controlling the said package delivery opening.

5. A corn popping machine including popping mechanism, filling mechanism, flavoring delivery mechanism, a package delivery opening, a holder for a supply of cartons, carton receiving mechanism, means for actuating said receiving mechanism for receiving one of the cartons from the said holder, and successively carrying the carton to the filling mechanism, flavoring delivery mechanism, and said delivery opening, and means individual to the said filling and flavoring delivery mechanism for controlling them and being responsive in their operations to certain of the operations of the carton carrying mechanism.

6. A corn popping machine including popping mechanism, means for supplying material to the popping mechanism, means for receiving the material from the popping mechanism, and means controlled by the accumulation of the material in the said receiving means for controlling the delivery of material to the popping mechanism.

7. A corn popping machine including popping mechanism, means for supplying material to the popping mechanism, means for receiving the material from the popping mechanism, and electro-responsive means controlled by the material in the said receiving means for controlling the delivery of material to the said popping mechanism.

8. A corn popping machine including popping mechanism, means for placing the popped corn into a carton, means for supplying flavoring into the carton, and means operating automatically to carry a carton to both of the aforesaid means and then placing the filled carton in a position to be removed from the machine.

9. A corn popping machine including filling mechanism, for receiving the popped corn, flavoring delivery mechanism, a holder for holding a supply of cartons, and means common to all of said mechanisms and operating automatically to receive one of the cartons from said holder, and successively carry it to the filling and buttering mechanism.

10. A corn popping machine including filling mechanism for receiving the popped corn, flavoring delivery mechanism, a holder for holding a supply of cartons, and means common to all of said mechanisms and operating automatically to receive one of the cartons from said holder, and successively carry it to the filling and flavoring delivery mechanism, and finally conveying the finished package to a position to be removed from the machine.

11. A corn popping machine including filling mechanism for receiving the popped corn, flavoring delivery mechanism, a holder for holding a supply of cartons, means common to all of said mechanisms and operating automatically to receive one of the cartons from said holder, and successively convey it to the filling and flavoring delivery mechanism, and finally conveying the completed package to a position to be removed from the machine, there being a delivery opening for the package, and means responsive to a portion of the operation of the first recited means for controlling the said delivery opening.

12. A corn popping machine including popping mechanism, means for supplying material to the popping mechanism, a receiver for receiving material from the popping mechanism, means for automatically filling a package with the material from the receiver, and means controlled by the material in the receiver for controlling the said popping mechanism and the means for supplying the material to the said popping mechanism.

13. A corn popping machine including corn popping mechanism, carton filling mechanism, flavoring delivery mechanism, a holder for a supply of cartons, means for receiving a carton from said holder and successively conveying it to the filling and flavoring delivering mechanisms and finally positioning the filled carton to be removed from the machine, and means responsive to the insertion of a check for controlling the operation of the said mechanism.

14. A corn popping machine including corn popping mechanism, carton filling mechanism, flavoring delivery mechanism, a holder for a supply of cartons, means for receiving a carton from said holder and successively conveying it to the filling and flavoring delivering mechanisms and finally positioning the filled carton to be removed from the machine, means responsive to the insertion of a check for controlling the operation of the said mechanisms, and additional means controlled by the accumulation of the material in the said feeding mechanism for controlling the operation of the said mechanism.

15. A corn popping machine including corn popping mechanism, carton filling mechanism, flavoring delivery mechanism, a holder for a supply of cartons, means for receiving a carton from said holder and successively conveying it to the filling and flavoring delivering mechanisms and finally positioning the filled carton to be removed from the machine, means responsive to the insertion of a check for controlling the operation of the said mechanism, and additional and electro-responsive means controlled by the material in the said filling mechanism for controlling the operation of all of the said mechanisms.

16. A corn popping machine including popping mechanism, means for supplying material to the popping mechanism, a receiver for receiving material from the popping mechanism, said popping mechanism being housed within the said receiver, means for automatically filling a package with the material from the receiver, and means controlled by the material in the receiver for controlling the operation of the said popping mechanism and the mechanism for supplying the material to the popping mechanism.

17. A corn popping machine including popping mechanism, means for supplying material to the popping mechanism, a receiver for receiving material from the popping mechanism, said popping mechanism being housed within the said receiver, means for automatically filling a package with the material from the receiver, an agitator within the receiver, and means controlled by the material in the receiver for controlling the operation of the said popping mechanism and the mechanism for supplying the material to the popping mechanism.

18. A corn popping machine including a holder for a supply of cartons, filling mechanism, flavoring delivery mechanism, and means for receiving a carton from the supply holder and successively conveying it to the filling and flavoring delivery mechanisms, the said means including mechanism for imparting bodily reciprocating and rotating movements thereto.

19. A corn popping machine including a holder for a supply of cartons, filling mechanism, flavoring delivery mechanism, and means for receiving a carton from the supply holder and successively conveying it to the filling and flavoring delivery mechanisms, the said means including formations controlled by the carton for gripping and removing the carton, and also mechanism for imparting bodily reciprocating and rotating movements thereto.

20. A machine for handling cartons and the like embodying a holder for the cartons, means for removing the cartons from the holder and intermittently conveying them to different stations in the machine, the said means embodying a rotatable and longitudinally reciprocable shaft, means for reciprocating the shaft and means for imparting intermittent steps of rotation to the shaft, the last recited means including tappet mechanism.

21. A machine for handling cartons and the like embodying a holder for the cartons, means for removing the cartons from the holder and intermittently conveying them to different stations in the machine, the said means embodying a rotatable and longitudinally reciprocable shaft, means for reciprocating the shaft, means for imparting intermittent steps of rotation to the shaft, the last recited means including tappet mechanism, and means operating to prevent overthrow of said shaft.

22. A machine for handling cartons and the like embodying a holder for the cartons, means for removing the cartons from the holder and intermittently conveying them to different stations in the machine, the said means embodying a rotatable and longitudinally reciprocable shaft, means for reciprocating the shaft, means for imparting intermittent steps of rotation to the shaft, the last recited means including tappet mechanism, and means reciprocable with the said shaft and operating to prevent rotary overthrow of the shaft.

23. A machine for handling cartons and the like embodying a holder for the cartons, means for removing the cartons from the holder and intermittently conveying them to different stations in the machine, the said means embodying a rotatable and longitudinally reciprocable shaft, means for reciprocating the shaft, means for imparting intermittent steps of rotation to the shaft, the last recited means including tappet mechanism, and means carried by and reciprocable with the shaft and frictionally operating upon the shaft to prevent rotary overthrow of the shaft.

24. A machine for handling cartons and the like embodying a holder for the cartons, means for removing the cartons from the holder and intermittently conveying them to different stations in the machine, the said means embodying a rotatable and longitudinally reciprocable shaft, means for reciprocating the shaft, means for imparting intermittent steps of rotation to the shaft, the last recited means including tappet mechanism, brake members reciprocable with the shaft and frictionally gripping the shaft to prevent rotary overthrow of the shaft, and means operating to maintain the said brake members against rotation with the shaft.

25. A corn popping machine including filling mechanism, flavoring holding means, means for receiving a carton and successively conveying the same to the filling mechanism and flavoring holding means, and means individual to the said filling mechanism and the said flavoring holding means and responsive in their operation to the operation of the said carton receiving and conveying means for delivering therefrom to the carton predetermined quantities of the respective contents thereof.

26. A corn popping machine including filling mechanism, flavoring holding means, means for receiving a carton and successively conveying the same to the filling mechanism and flavoring holding means, means individual to the said filling mechanism and the said flavoring holding means and responsive in their operation to the operation of the said carton receiving and conveying means for delivering therefrom to the carton predetermined quantities of the respective contents thereof, and means also responsive to the operation of the said carton receiving and conveying means for rendering the filled carton accessible from the outside of the machine.

In testimony whereof I have signed my name to this specification, on this 22nd day of February, A. D. 1926.

FRANK A. HILL.